Patented June 18, 1940

2,204,741

UNITED STATES PATENT OFFICE 2,204,741

DYESTUFFS OF THE ANTHRAQUINONE SERIES

Alexander J. Wuertz, Villa Monterey, Del., and William L. Rintelman, Elmer, N. J., assignors to E. I. du Pont de Nemours & Company, Wilmington, Del., a corporation of Delaware No Drawing. Application October 21, 1938, Serial No. 236,295

1 Claim. (Cl. 260—278)

This invention relates to the preparation of new and valuable dyestuffs of the anthraquinone series, and more particularly to the preparation of new dyestuffs of the general formula:

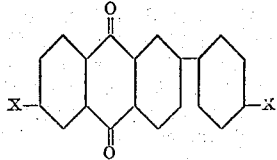

in which at least one X stands for an (N-methyl) anthrapyridone-4-imino group which compounds dye in very desirable bluish red shades of good fastness properties.

According to this invention, the halogen-containing 2-phenylanthraquinone, in which the halogen is present in the 4'- and/or 6-position, may be condensed with 4-amino-(N-methyl)anthrapyridone by the use of the Ullmann condensation reaction. The resulting compounds, when either 1 or 2 moles of 4-amino-(N-methyl)anthrapyridone are employed, give dyestuffs which dye in desirable bluish red shades.

The following examples are given to illustrate the invention in which the parts used are by weight.

Example 1

19.6 parts of the mixed 6- and 7-bromo-4'-chloro-2-phenylanthraquinone (described in Example 2 of copending U. S. application Serial No. 236,294. The process for preparing this intermediate is given hereinafter). 13.8 parts of 4-amino-1:9(N-methyl)anthrapyridone, 20 parts of sodium carbonate, 0.5 part of cuprous chloride are heated together in 250 parts of nitrobenzene for 16 hours at 205° C. At the end of this period the reaction mass is poured into cold water and the solvent removed by steam distillation. The aqueous suspension of deep red crystals is filtered off, washed and dried.

The resulting product dyes cotton in bright bluish red shades, from a red orange vat, which are very fast to light and washing. Nitrogen and chlorine analysis show it to be essentially a mono-molecular condensation product of the following formula:

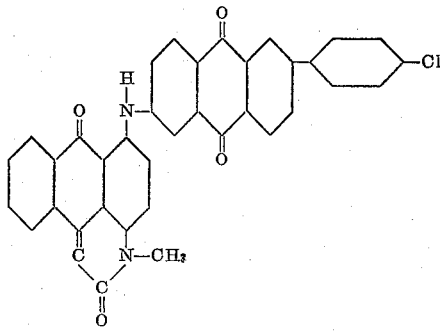

Example 2

If the above procedure is repeated, using molten naphthalene as a solvent, also with the 4-amino-1:9(N-methyl)anthrapyridone increased to 17.5 parts, and heated to 215° C. for 14 hours or longer, dimolecular condensation takes place giving a compound of the following formula:

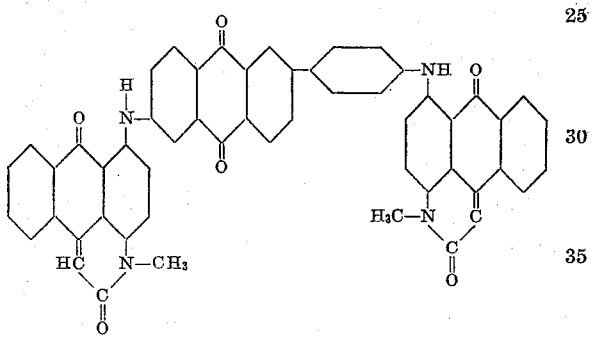

Instead of removing the naphthalene by steam distillation, the finished reaction mass may be diluted with about 500 parts of o-dichlorobenzene and filtered hot (100° C.) giving a dark red crystalline product which dissolves in 95% sulfuric acid imparting to it a violet coloration. The product dyes cotton in bright bluish red shades, from a red orange vat and possesses excellent fastness properties. The dicondensation product of this example forms the subject matter of copending application Serial No.

296,046 which was filed as a division of this application on September 22, 1939.

As illustrated in the above examples, the condensation products are in themselves dyestuffs and do not require further ring-closure with aluminum chloride.

As illustrated in the above examples, the isomeric mixture of the 6- and 7-bromo-4'-chloro-2-phenylanthraquinone may be employed in the preparation of applicants' new and valuable red dyestuffs, although it is understood that either of the isomeric compounds may be employed after separation and that the corresponding chloro or bromo compounds may be used in place of the ones specifically mentioned in the examples.

The mixed 6- and 7-bromo-4'-chloro-2-phenyl-anthraquinone employed in the above examples is prepared according to the procedure given in Examples 1 and 2 of copending application Serial No. 236,294, as follows:

245 parts of 4-bromophthalic acid, (M. P. 163–167° C.), are suspended in 1225 parts of o-dichlorobenzene and heated at a temperature between 120 and 175° C. until water is no longer liberated. The 4-bromophthalic acid dissolves in the hot solvent only after being dehydrated to the anhydride. The solution is now cooled to 15 to 16° C. and 178 parts of p-chlorodiphenyl, and 292 parts of dry aluminum chloride lumps are added. The mass is agitated for about 10 hours, the temperature being allowed to rise to 20 to 25° C. during the stirring and finally heated to 75 to 80° C. and held 1 hour or longer to complete the reaction. When the evolution of hydrochloric acid gas has ceased, the green solution is cooled to 20 to 25° C. and poured into an agitated mixture of ice and water containing about 100 parts of 30% hydrochloric acid. The entire emulsion is diluted to 10,000 parts with water and stirred for about 1 hour or until two layers are formed when the agitation is stopped. The supernatent aqueous layer is then decanted off and the oily layer washed several times by agitation and decantation using fresh water. When thoroughly washed, a solution of 50 parts of caustic soda in 100 parts of water is added and the solvent removed by steam distillation. The remaining aqueous solution is now filtered to remove the insoluble impurities and then slowly run into a well agitated mixture of ice and water containing 200 parts of 30% hydrochloric acid. A small amount of ice should be present during the precipitation. The resulting white precipitate is filtered off by suction, washed acid-free and dried.

A mixture of 4''-chloro-4-phenyl-2-benzoyl-4- and 5-bromobenzoic acids is obtained in an almost quantitative yield. The product has a melting range of 172 to 190° C. After three successive recrystallizations from toluene, glacial acetic acid and toluene in turns, the melting range is raised to 205 to 210° C. The product dissolves in strong sulfuric acid with a bluish red color when viewed by transmitted light and purple with reflected light.

100 parts of the mixture of 4''-chloro-4-phenyl-2-benzoyl-4- and 5-bromobenzoic acid described above are dissolved in 400 parts of 96 to 98% sulfuric acid and heated at 125° C. until a test shows complete ring-closure. About 4 hours' time is required. The cooled acid solution is drowned in water, filtered and washed acid-free.

It is not necessary, however, to drown the reaction mass in order to isolate the compound for it crystallizes out of the acid on cooling and may be recovered by filtration of the acid magma. In this manner a higher proportion of the one isomer, (4'-chloro-2-phenyl-6-bromoanthraquinone) is obtained. The melting point of the crude mixture of isomers, obtained by drowning the total mass, is 175 to 185° C., while that isolated by crystallization from the concentrated sulfuric acid is 190 to 210° C. On crystallization of the latter material from 10 parts of nitrobenzene, the latter melting point of the 4'-chloro-2-phenyl-6-bromoanthraquinone may be raised to 210 to 220° C. It dissolves in 96% sulfuric acid with a red color, in 100% sulfuric acid it gives a bluer red. In thionyl chloride it dissolves to give an orange color.

The material from the concentrated sulfuric acid filtrate, when twice recrystallized from 5 parts o-dichlorobenzene, melts at 220 to 228° C.

We claim:

The dyestuff of the formula:

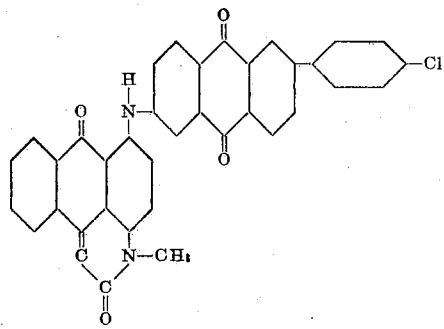

which dyes cotton from a red orange vat in bright bluish red shades of excellent fastness properties.

ALEXANDER J. WUERTZ.
WILLIAM L. RINTELMAN.